United States Patent
Matsui

(10) Patent No.: US 10,015,345 B2
(45) Date of Patent: Jul. 3, 2018

(54) IMAGE FORMING APPARATUS AND METHOD FOR PERFORMING PREPARATION OPERATION PRIOR TO ACCEPTANCE OF JOB EXECUTING INSTRUCTION

(71) Applicant: BROTHER KOGYO KABUSHIKI KAISHA, Nagoya-shi, Aichi-ken (JP)

(72) Inventor: Yuki Matsui, Kiyosu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/007,798

(22) Filed: Jan. 27, 2016

(65) Prior Publication Data

US 2016/0219179 A1    Jul. 28, 2016

(30) Foreign Application Priority Data

Jan. 28, 2015 (JP) .................... 2015-014685

(51) Int. Cl.
*H04N 1/193* (2006.01)
*H04N 1/00* (2006.01)

(52) U.S. Cl.
CPC ....... *H04N 1/00917* (2013.01); *H04N 1/0032* (2013.01); *H04N 2201/0094* (2013.01)

(58) Field of Classification Search
CPC .......... H04N 1/00474; H04N 1/00482; H04N 2201/0094
See application file for complete search history.

(56) References Cited

U.S. PATENT DOCUMENTS

| | | | |
|---|---|---|---|
| 4,770,555 A | | 9/1988 | Deschamps et al. |
| 9,770,929 B2* | | 9/2017 | Horade ............. B41J 29/393 |
| 2004/0184081 A1 | | 9/2004 | Yamamoto |
| 2008/0094444 A1 | | 4/2008 | Sakurai |
| 2009/0060555 A1* | | 3/2009 | Okada ................... B41J 3/46 399/81 |
| 2011/0310423 A1* | | 12/2011 | Motosugi ......... H04N 1/00355 358/1.13 |

(Continued)

FOREIGN PATENT DOCUMENTS

| | | |
|---|---|---|
| EP | 1591262 A2 | 2/2005 |
| JP | 2-39967 A | 2/1990 |

(Continued)

OTHER PUBLICATIONS

Related U.S. Appl. No. 15/009,306, filed Jan. 28, 2016.

(Continued)

*Primary Examiner* — Benny Q Tieu
*Assistant Examiner* — Haris Sabah
(74) *Attorney, Agent, or Firm* — Merchant & Gould P.C.

(57) ABSTRACT

An image forming apparatus including a transmission assembly configured to establish and interrupt a connection between a motor and at least one sheet feeder, and a controller configured to accept a selection of one of a first and a second job, and in response to acceptance of the first job including an operation of driving the at least one sheet feeder, begin a preceding process in advance of accepting an instruction to execute the first job. In the preceding process, the controller controls the transmission assembly to establish the connection between the motor and the at least one sheet feeder.

22 Claims, 8 Drawing Sheets

(56) References Cited

U.S. PATENT DOCUMENTS

| | | | |
|---|---|---|---|
| 2012/0146282 A1* | 6/2012 | Chiba | B65H 1/14 271/160 |
| 2012/0200872 A1* | 8/2012 | Ito | B41J 29/38 358/1.12 |
| 2012/0249707 A1 | 10/2012 | Horade | |
| 2014/0021677 A1* | 1/2014 | Nunokawa | B65H 5/26 271/9.08 |
| 2016/0224876 A1 | 8/2016 | Horade | |
| 2017/0087895 A1 | 3/2017 | Arai | |

FOREIGN PATENT DOCUMENTS

| JP | 10-235970 A | 9/1998 |
|---|---|---|
| JP | 2000-163225 A | 6/2000 |
| JP | 2000-218894 A | 8/2000 |
| JP | 2002-73300 A | 3/2002 |
| JP | 2004-237505 A | 8/2004 |
| JP | 2005-238710 A | 9/2005 |
| JP | 2005-313440 | 11/2005 |
| JP | 2008-105209 A | 5/2008 |
| JP | 2010-117792 A | 5/2010 |

OTHER PUBLICATIONS

U.S. Appl. No. 15/277,608, filed Sep. 27, 2016.
Office Action issued in related U.S. Appl. No. 15/009,306, dated Dec. 1, 2016.
U.S. Office Action (Restriction Requirement) issued in related U.S. Appl. No. 15/009,306 dated Jun. 20, 2016.
Office Action (Notice of Allowance) issued in related U.S. Appl. No. 15/009,306, dated May 24, 2017.
Office Action in related U.S. Appl. No. 15/277,608 dated Aug. 22, 2017.
Office Action (Final Rejection) issued in related U.S. Appl. No. 15/277,608 dated Feb. 15, 2018.

* cited by examiner ized to form an image on a sheet by discharging ink droplets from a
IMAGE FORMING APPARATUS AND METHOD FOR PERFORMING PREPARATION OPERATION PRIOR TO ACCEPTANCE OF JOB EXECUTING INSTRUCTION

CROSS-REFERENCE TO RELATED APPLICATION

This application claims priority under 35 U.S.C. § 119 from Japanese Patent Application No. 2015-014685 filed on Jan. 28, 2015. The entire subject matter of the application is incorporated herein by reference.

BACKGROUND

Technical Field

The following description relates to one or more aspects of an image forming apparatus and a method for performing preparation operations prior to acceptance of a job executing instruction.

Related Art

A multi-function peripheral (hereinafter referred to as an "MFP") has been known that serves as a printer, an image scanner, and a copy machine. Specifically, for instance, an inkjet-type MFP has been known that is configured to form an image on a sheet by discharging ink droplets from a recording head.

In the known MFP, a recovery process to eliminate a cause of failure in discharging ink droplets is performed prior to an ink discharging operation. For example, a technique has been known that is adapted to perform the recovery process in response to a user operation being performed before the start of document scanning. Thereby, it is possible to execute a copy job in a short time without excessively performing the recovery process.

SUMMARY

However, in the known MFP, the user operation to be performed before the start of document scanning may not necessarily be a user operation to execute a copy job. For instance, a user operation to use the MFP as an image scanner may be performed before the start of document scanning. In this case, a preparatory process such as the recovery process to be performed before image formation is wasted.

Aspects of the present disclosure are advantageous to provide one or more improved techniques for an image forming apparatus configured to execute a plurality of kinds of jobs including a first job that includes an operation of driving at least one sheet feeder and a second job that does not include the operation of driving the at least one sheet feeder, the techniques making it possible to efficiently perform a preparatory process in advance of driving the at least one sheet feeder.

According to aspects of the present disclosure, an image forming apparatus is provided, which includes a motor, at least one sheet feeder configured to feed a sheet in response to receipt of a driving force from the motor, a transmission assembly configured to establish and interrupt a connection between the motor and the at least one sheet feeder, an operation panel configured to accept a user input, and a controller configured to accept a selection of one of a first job and a second job via the operation panel, the first job including an operation of driving the at least one sheet feeder, the second job not including the operation of driving the at least one sheet feeder, in response to acceptance of a selection of the first job, begin a preceding process in advance of accepting an instruction to execute the first job, the preceding process including controlling the transmission assembly to establish the connection between the motor and the at least one sheet feeder, after the acceptance of the selection of the first job, accept the instruction to execute the first job via the operation panel, and based on the acceptance of the instruction, execute the first job.

According to aspects of the present disclosure, further provided is a method adapted to be implemented on a processor coupled with an image forming apparatus including a motor, at least one sheet feeder, a transmission assembly, and an operation panel, the method including accepting a selection of one of a first job and a second job via the operation panel, the first job including an operation of driving the at least one sheet feeder, the second job not including the operation of driving the at least one sheet feeder, in response to acceptance of a selection of the first job, beginning a preceding process in advance of accepting an instruction to execute the first job, the preceding process including controlling the transmission assembly to establish a connection between the motor and the at least one sheet feeder, the transmission assembly being configured to establish and interrupt the connection between the motor and the at least one sheet feeder, after the acceptance of the selection of the first job, accepting the instruction to execute the first job via the operation panel, and based on the acceptance of the instruction, executing the first job.

BRIEF DESCRIPTION OF THE ACCOMPANYING DRAWINGS

FIG. 1 is a block diagram schematically showing a configuration of a multi-function peripheral (MFP) in accordance with one or more aspects of the present disclosure.

FIG. 2 schematically shows a configuration around a conveyance path of a carriage of the MFP in accordance with one or more aspects of the present disclosure.

Figure 6:
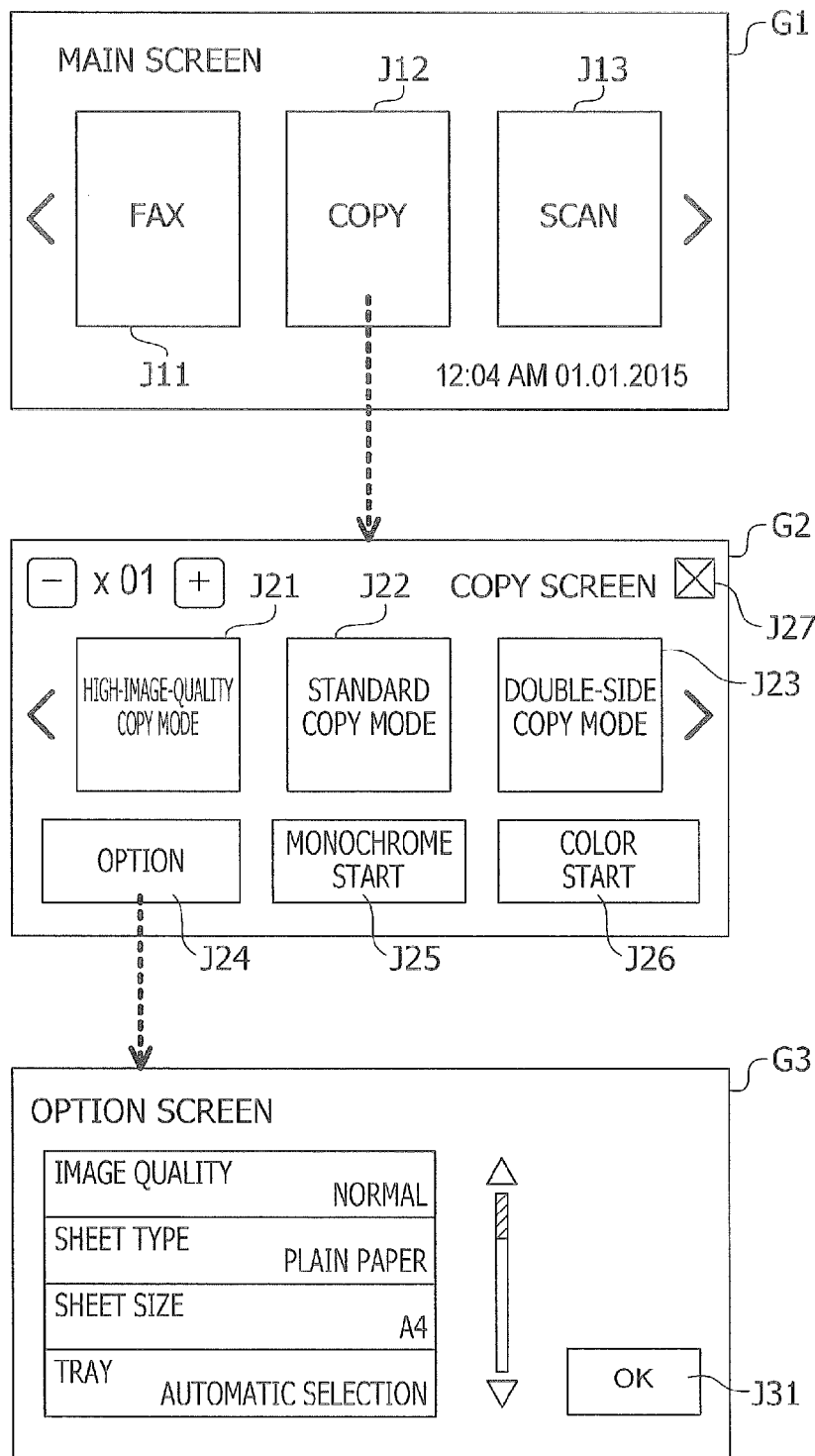

FIG. 6 exemplifies a main screen, a copy screen, and an option screen to be displayed on a display of the MFP in accordance with one or more aspects of the present disclosure.

Figure 7:
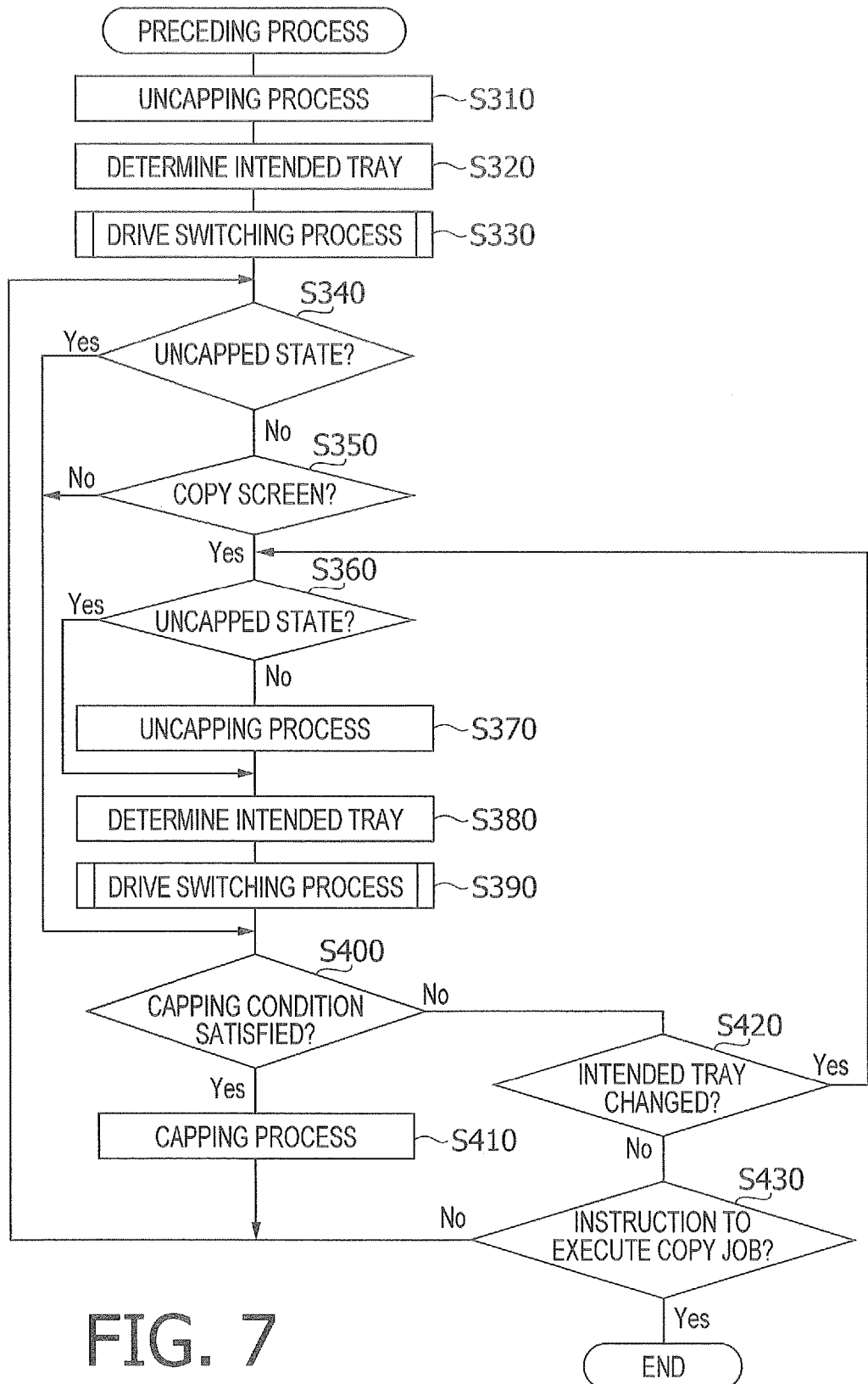

FIG. 7 is a flowchart showing a procedure of a preceding process to be executed by the controller of the MFP in accordance with one or more aspects of the present disclosure.

Figure 8:
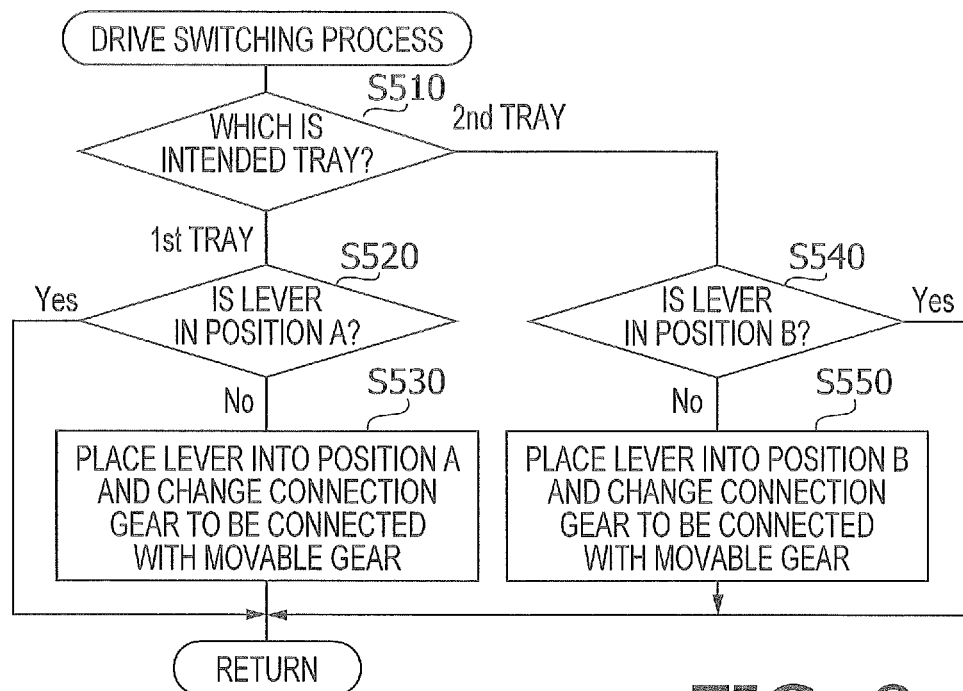

FIG. 8 is a flowchart showing a procedure of a drive switching process to be executed by the controller of the MFP in accordance with one or more aspects of the present disclosure.

Figure 9:
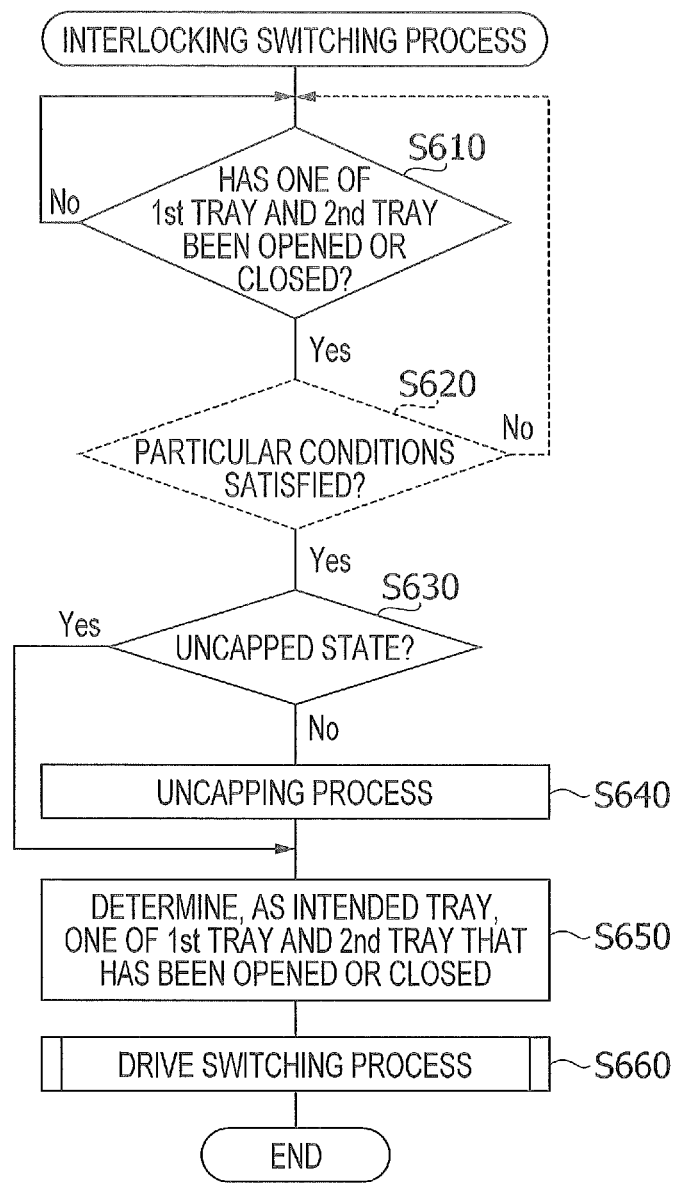

FIG. 9 is a flowchart showing a procedure of an interlocking switching process to be executed by the controller of the MFP in accordance with one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

Figure 1:
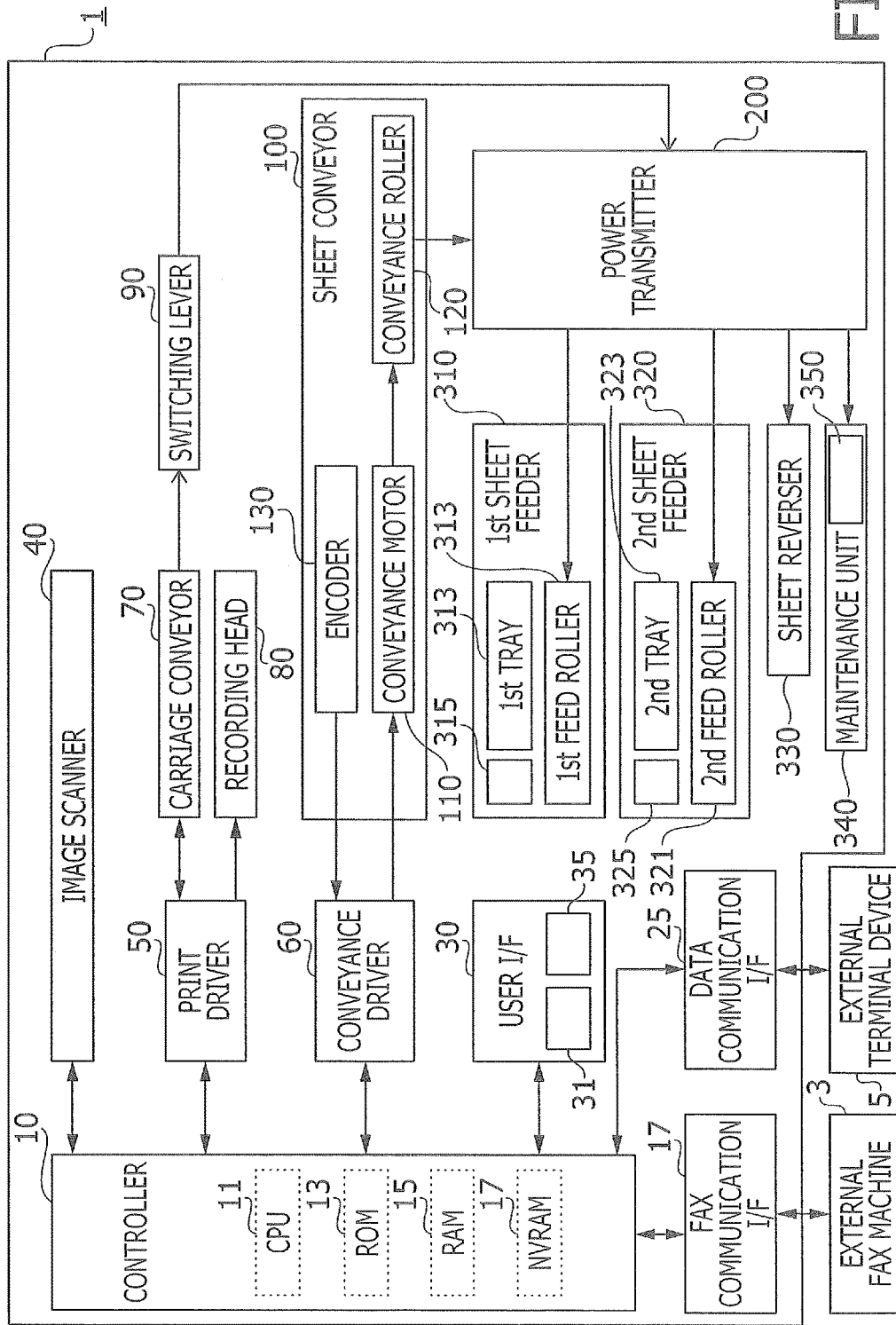

In a first illustrative embodiment, a multi-function peripheral (MFP) 1 shown in FIG. 1 has a plurality of functions such as a printing function, a scanning function, a copy function, and a facsimile function. In other words, the MFP 1 serves as a printer, an image scanner, a copy machine, and a facsimile machine.

The MFP 1 includes a controller 10, a facsimile communication interface (hereinafter referred to as a "FAX communication I/F") 20, a data communication interface (hereinafter referred to as a "data communication I/F") 25, a user interface (hereinafter referred to as a "user I/F") 30, an image scanner 40, a print driver 50, and a conveyance driver 60.

The MFP 1 further includes an image forming unit, a transmission assembly. The image forming unit includes a carriage conveyor 70 and a recording head 80. The transmission assembly includes a switching lever 90 and a power transmitter 200. The MFP 1 also includes a sheet conveyor 100, a first sheet feeder 310, a second sheet feeder 320, a sheet reverser 330, and a maintenance unit 340.

The controller 10 includes a CPU 11, a ROM 13, a RAM 15, and an NVRAM 17. The ROM 13 is configured to store various programs. The NVRAM 17 is an electrically-rewritable non-volatile memory configured to store data and programs that needs to be saved even after the MFP 1 is powered off. The CPU 11 is configured to execute processes in accordance with programs stored in the ROM 13 or the NVRAM 17. The RAM 15 is used as a work area during execution of the processes by the CPU 11.

The CPU 11 takes overall control of individual elements included in the MFP 1 by executing the processes in accordance with the programs stored in the ROM 13 or the NVRAM 17. Thereby, the CPU 11 achieves various functions. Hereinafter, the processes or operations by the CPU 11 may be described as processes or operations by the controller 10.

The FAX communication unit 20 is configured to perform facsimile communication with an external facsimile machine 3. The data communication I/F 25 is configured to perform data communication with an external terminal device 5 such as a personal computer. More specifically, for instance, the data communication I/F 25 is configured to perform USB communication or Bluetooth (trademark registered) communication with the external terminal device 5. The data communication I/F 25 may be configured to perform data communication with the external terminal device 5 via a wired or wireless LAN.

The user I/F 30 includes a display 31 and an operation panel 35. The display 31 is configured to display information for a user. For instance, the display 31 may be a liquid crystal display. The operation panel 35 is operable by the user and configured to accept user operations. For instance, the operation panel 35 may be a touch panel provided on a screen of the display 31. Alternatively, the operation panel 35 may include a group of mechanical switches (e.g., buttons) or a combination of a touch panel and mechanical switches.

The image scanner 40 is configured to optically scan a document placed on a document table or a document fed by an automatic document feeder, in accordance with instructions from the controller 10. Scanned image data, which represents a scanned image of the document, is transmitted to the controller 10.

The print driver 50 is configured to control conveyance of a carriage 71 (see FIG. 2) with the recording head 80 mounted thereon and control an operation of discharging ink droplets from the recording head 80 in accordance with instructions from the controller 10. The print driver 50 controls the carriage conveyor 70 and thereby controls movement of the carriage 71 along a main scanning direction. The main scanning direction is perpendicular to a sub scanning direction (i.e., a sheet conveyance direction) in which sheets Q are conveyed.

Figure 2:
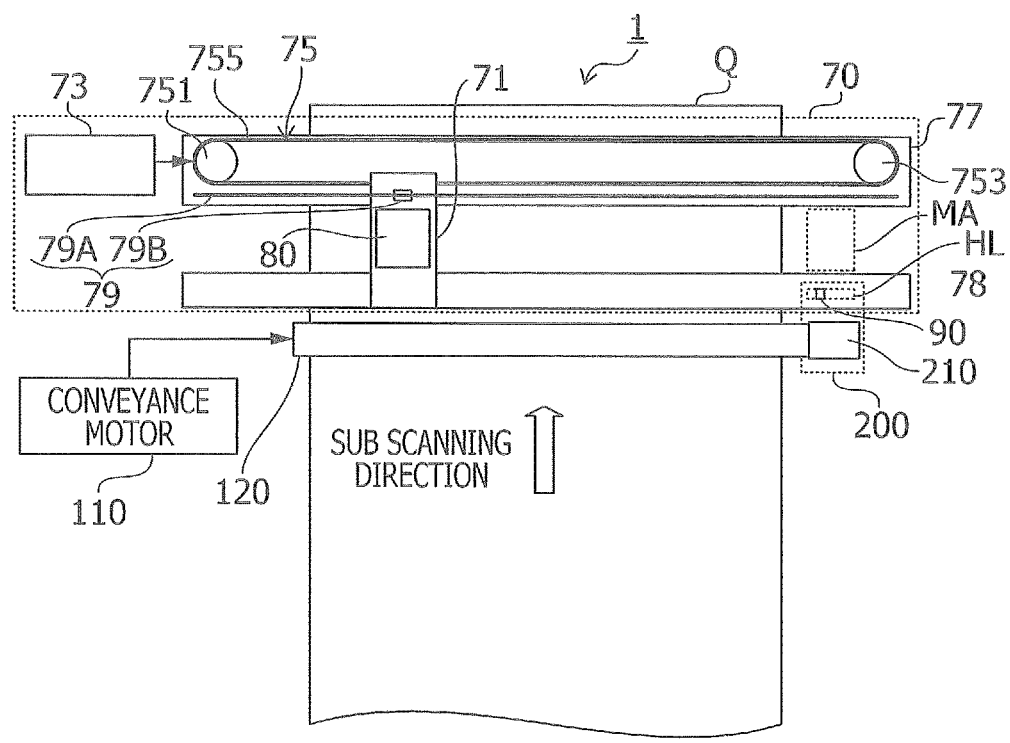

As shown in FIG. 2, the carriage conveyor 70 includes the carriage 71, a motor 73, a belt mechanism 75, guide rails 77 and 78, and a linear encoder 79. The motor 73 is controlled by the print driver 50.

The belt mechanism 75 includes a driving pulley 751, a driven pulley 753, and a belt 755. The driving pulley 751 and the driven pulley 753 are arranged along the main scanning direction. The belt 755 is wound around the driving pulley 751 and the driven pulley 753. The carriage 71 is fixedly attached to the belt 755. In the belt mechanism 75, the driving pulley 751 rotates in response to receiving a driving force from the motor 73. The belt 755 and the driven pulley 53 are driven to rotate in accordance with rotation of the driving pulley 751.

The guide rails 77 and 78 extend along the main scanning direction, and are spaced apart from each other in the sub scanning direction. A hole HL is formed at the guide rail 78. The switching lever 90 protrudes upward (i.e., to a position above a carriage conveyance path) from beneath the guide rail 78 via the hole HL. The switching lever 90 will be described later in detail with reference to FIGS. 4A and 4B.

The belt mechanism 75 is disposed at the guide rail 77. For instance, a projection (not shown) extending in the main scanning direction is provided at each of the guide rails 77 and 78, so as to restrict the moving direction of the carriage 71 to the main scanning direction. For instance, the carriage 71 is placed on the guide rails 77 and 78 such that grooves provided at a lower surface of the carriage 71 engage with the projections. In this state, the carriage 71 reciprocates along the main scanning direction on the guide rails 77 and 78 in conjunction with rotation of the belt 755. The recording head 80 is carried along the main scanning direction with movement of the carriage 71.

The linear encoder 79 is configured to enable the print driver 50 to detect a position of the carriage in the main scanning direction. Specifically, the linear encoder 79 includes an encoder scale 79A, and an optical sensor 79B. The encoder scale 79A is fixedly attached to the guide rail 77. The optical sensor 79B is fixedly attached to the carriage 71. The linear encoder 79 detects, by the optical sensor 79B, a change of a relative position between the encoder scale 79A and the optical sensor 79B, and inputs a detection signal representing the change of the relative position into the print driver 50 as an encoder signal.

The print driver 50 detects the position of the carriage 71 in the main scanning direction, based on the encoder signal from the linear encoder 79. The print driver 50 controls the position and the velocity of the carriage 71 in the main scanning direction, by controlling the motor 73 based on the detected position of the carriage 71. Further, the print driver 50 controls the operation of discharging ink droplets by the recording head 80 in accordance with movement of the carriage 71, so as to let the ink droplets land on intended positions on a sheet Q.

The conveyance driver 60 (see FIG. 1) controls a conveyance motor 110 in accordance with instructions from the controller 10. The sheet conveyor 100 includes the conveyance motor 110, a conveyance roller 120, and a rotary encoder 130. The conveyance motor 110 is linked with the conveyance roller 120. Thereby, the conveyance roller 120 is driven to rotate by the conveyance motor 110.

The conveyance roller 120 is disposed upstream of an ink discharge position where the recording head 80 discharges ink droplets in the sheet conveyance direction. The conveyance roller 120 has a rotational axis parallel to the main scanning direction. The conveyance roller 120 is configured to, when rotating, convey the sheet Q fed from upstream, toward the ink discharge position in the sub scanning direction. The conveyance roller 120 is disposed to face a pinch roller (not shown). The sheet conveyor 120 conveys the sheet Q by rotating the conveyance roller 120 in a state where the sheet Q is pinched between the conveyance roller 120 and the pinch roller.

The rotary encoder 130 is configured to enable the conveyance driver 60 to detect a rotational quantity and a rotational speed of the conveyance roller 120. Specifically, the rotary encoder 130 is configured to output an encoder signal according to rotation of the conveyance roller 120. For instance, the rotary encoder 130 is disposed on a power transmission path between the conveyance motor 110 and the conveyance roller 120.

The conveyance driver 60 detects the rotational quantity and the rotational speed of the conveyance roller 120 based on the encoder signal from the rotary encoder 130, and controls the conveyance motor 110. Thus, the conveyance driver 60 controls the rotation of the conveyance roller 120 and thereby controls conveyance of the sheet Q.

The power transmitter 200 is disposed at a specific end portion of the conveyance roller 120. The specific end portion of the conveyance roller 120 is opposite to another end portion thereof connected with the conveyance motor 110. The power transmitter 200 is configured to receive a driving force from the conveyance motor 110 via the conveyance roller 120 and transmit the driving force to one of driven targets (i.e., the first sheet feeder 310, the second sheet feeder 320, the sheet reverser 330, and the maintenance unit 340).

The first sheet feeder 310 includes a first feed roller 311, a first tray 313, and a first opening-closing sensor 315. The first feed roller 311 rotates in response to receiving the driving force transmitted from the conveyance motor 110 via the conveyance roller 120 and the power transmitter 200. The first sheet feeder 310 feeds sheets Q set in the first tray 313 to the conveyance roller 120, by rotation of the first feed roller 311. The first opening-closing sensor 315 detects opening and closing of the first tray 313. A detection signal from the first opening-closing sensor 315 is input into the controller 10.

In the same manner as the first sheet feeder 310, the second sheet feeder 320 includes a second feed roller 321, a second tray 323, and a second opening-closing sensor 325. The second feed roller 321 rotates in response to receiving the driving force transmitted from the conveyance motor 110 via the conveyance roller 120 and the power transmitter 200. The second sheet feeder 320 feeds sheets Q set in the second tray 323 to the conveyance roller 120, by rotation of the second feed roller 321. The second opening-closing sensor 325 detects opening and closing of the second tray 323. A detection signal from the second opening-closing sensor 325 is input into the controller 10.

The sheet reverser 330 is driven in a double-side printing mode. The sheet reverser 330 operates in response to receiving the driving force from the conveyance motor 110 via the conveyance roller 120 and the power transmitter 200. The sheet reverser 330 is configured to reverse a sheet Q, which has passed downstream of a print position (i.e., the ink discharge position) of the recording head 80 in the sheet conveyance direction, upside down, and re-feed the sheet Q upstream of the print position in the sheet conveyance direction.

The maintenance unit 340 is configured to perform maintenance of the recording head 80. The maintenance unit 340 includes a capping mechanism 350 and a pump (not shown). The pump operates in response to receiving the driving force from the conveyance motor 110 via the power transmitter 200.

The capping mechanism 350 is disposed in a maintenance area MA (see FIG. 2) on the carriage conveyance path. The maintenance area MA is positioned at an end portion of the carriage conveyance path in the main scanning direction. A middle portion of the carriage conveyance path in the main scanning direction is a main area in which the recording head 80 reciprocates to perform image formation on the sheet Q.

Figure 3:
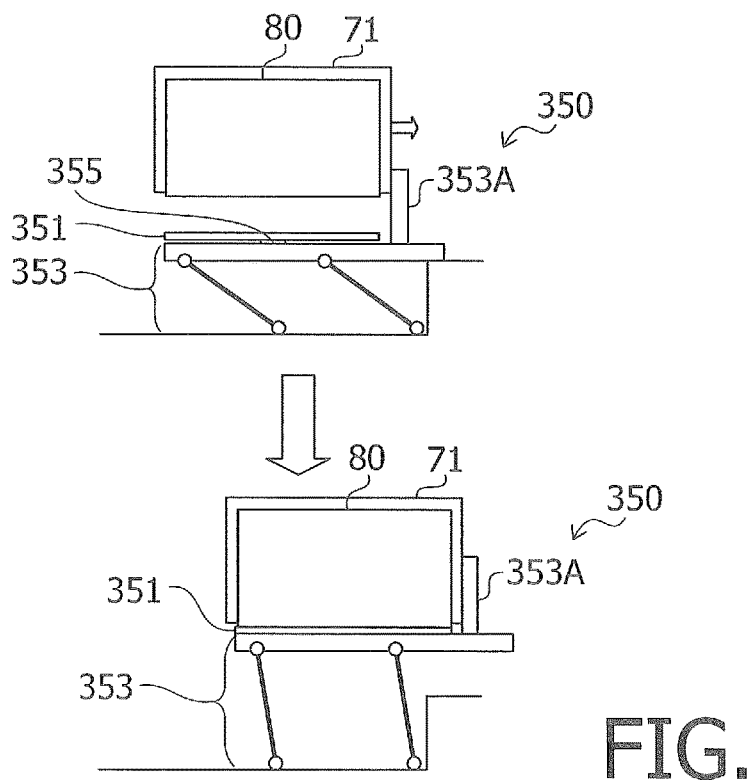
FIG. 3 is a side view schematically showing a configuration of a capping mechanism of the MFP in accordance with one or more aspects of the present disclosure.

As shown in FIG. 3, the capping mechanism 350 includes a cap 351 and an elevator 353. The cap 351 is configured to cover a nozzle surface of the recording head 80. In the nozzle surface, discharge ports for discharging ink droplets are arranged. The cap 351 is connected with the elevator 353 via a spring 355. An upper part of FIG. 3 schematically shows a positional relationship between the cap 351 and the elevator 353 before the cap 351 is attached onto the recording head 80. A lower part of FIG. 3 schematically shows a positional relationship between the cap 351 and the elevator 353 after the cap 351 is attached onto the recording head 80.

The elevator 353 has a wall 353A configured to contact the carriage 71. The elevator 353 operates in response to receiving a force from the carriage 71. Specifically, in response to the carriage 71 coming into the maintenance area MA from the main area and moving to a terminal end of the carriage conveyance path, the elevator 353 gradually lifts up the cap 351 in response to receipt of the force from the carriage 71 via the wall 353A, and attaches the cap 351 onto the nozzle surface of the recording head 80. The attachment of the cap 351 is completed in response to the carriage 71 reaching the terminal end of the carriage conveyance path.

In response to the carriage 71 leaving the terminal end of the carriage conveyance path and moving toward the main area, the elevator 353 is released from a state where the elevator 353 is receiving the force from the carriage 71 via the wall 353A, and takes the cap 351 down by its own weight. In response to the cap 351 being taken down, the cap 351 is detached from the recording head 80.

Thus, the capping mechanism 350 mechanically operates in response to receiving the force from the carriage 71, and detachably attaches the cap 351 onto the recording head 80. The pump operates in response to receipt of the driving force from the conveyance motor 110 in a state where the cap 351 is attached on the recording head 80, and the pump sucks and retrieves ink droplets discharged to the cap 351 from the recording head 80.

Figure 4:
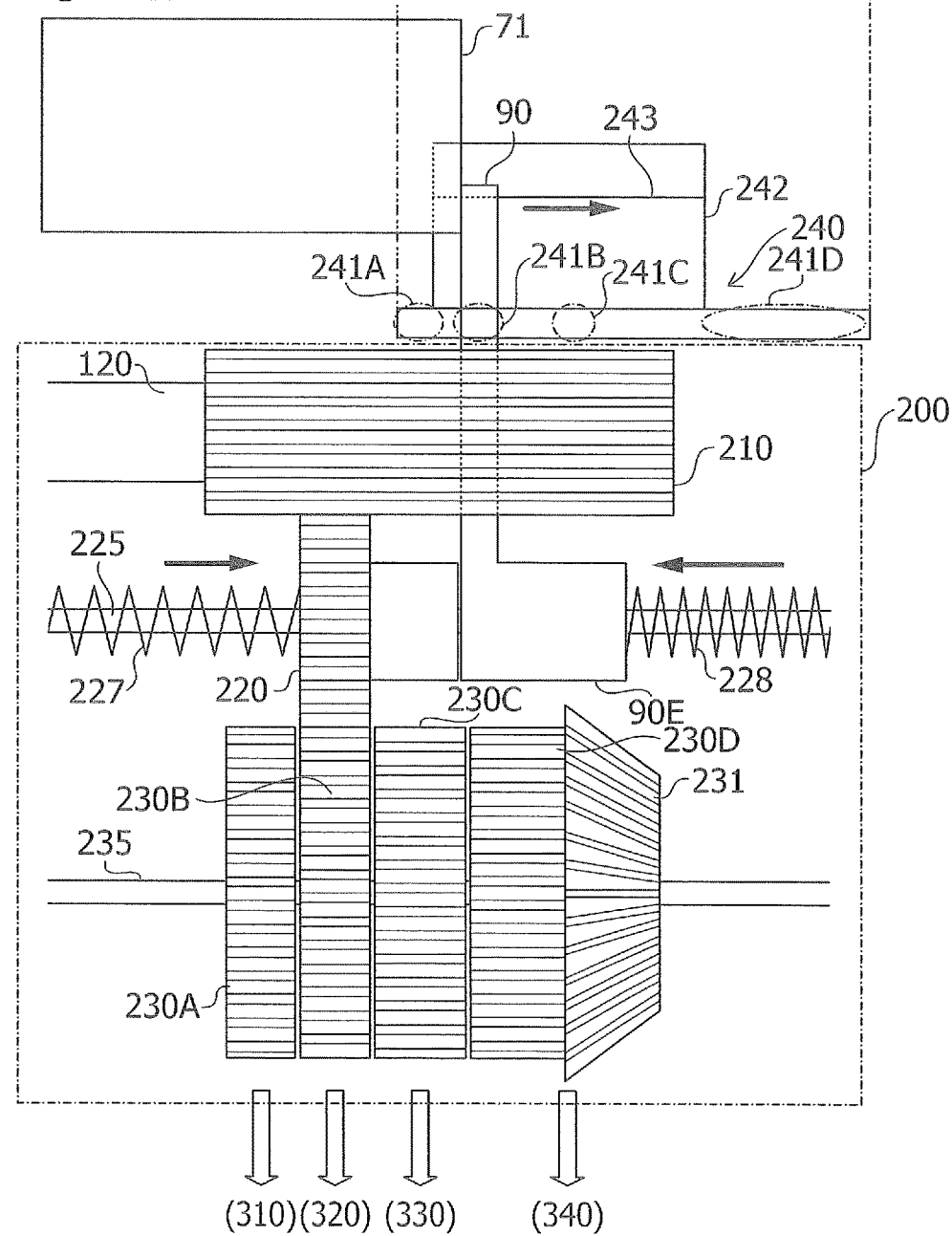
FIG. 4A is a plane view schematically showing a configuration of a lever holder of the MFP in accordance with one or more aspects of the present disclosure.
FIG. 4B is a side view schematically showing a configuration of a power transmitter of the MFP in accordance with one or more aspects of the present disclosure.

Subsequently, the power transmitter 200 will be described in detail. As shown in FIG. 4B, the power transmitter 200 includes a driving gear 210, a movable gear 220, and connection gears 230A, 230B, 230C, and 230D. The connection gears 230A, 230B, 230C, and 230D correspond to the first sheet feeder 310, the second sheet feeder 320, the sheet reverser 330, and the maintenance unit 340, respectively. The driving gear 210, the movable gear 220, and the connection gears 230A, 230B, 230C, and 230D are formed as spur gears. Hereinafter, a written expression "the connection gears 230A-D" will be used to represent the connection gears 230A, 230B, 230C, and 230D. Further, a written expression "the connection gear 230" will be used to represent an unspecified one of the connection gears 230A, 230B, 230C, and 230D.

The driving gear 210 is fixedly attached to an end portion of the conveyance roller 120 such that a rotational axis of the driving gear 210 is positionally coincident with a rotational axis of the conveyance roller 120. Thereby, the driving gear 210 rotates integrally with the conveyance roller 120. The driving gear 210 has such a dimension in an axial direction thereof as to always engage with the movable gear 220 within a movable range of the movable gear 220.

The movable gear 220 is disposed to always engage with the driving gear 210 and have a rotational axis parallel to the rotational axis of the driving gear 210. Along the rotational axis of the movable gear 220, a shaft 225 is inserted through a hole formed at a rotational center of the movable gear 220. Thereby, the movable gear 220 is disposed to be rotatable relative to the shaft 225 and slidable in its axial direction.

The movable gear 220 is configured to be guided by the shaft 225 and move between the connection gears 230A and 230D. The connection gears 230A-D are arranged along the rotational axis (the shaft 225) of the movable gear 220 such that their side surfaces perpendicular to a rotational axis of the connection gears 230A-D face each other in a rotational axis direction of the connection gears 230A-D. The movable gear 220 has such a dimension in its axial direction as to individually engage with each of the connection gears 230A-D.

The shaft 225 supports the switching lever 90 such that an end portion 90E of the switching lever 90 is movable in a sliding manner. The end portion 90E of the switching lever 90 is disposed closer to the terminal end of the carriage conveyance path than the movable gear 220, so as to adjoin the movable gear 220.

Two springs 227 and 228 are attached to the shaft 225 and disposed to pinch therebetween the movable gear 220 and the end portion 90E of the switching lever 90. An urging force of the spring 228 is larger than an urging force of the spring 227. Accordingly, the switching lever 90 receives an urging force in a direction toward the connection gear 230A from the connection gear 230D, throughout a movable range of the switching lever 90. The movable gear 220 receives the urging force from the spring 227. Therefore, in response to the switching lever 90 moving from the connection gear 230A to the connection gear 230D, the movable gear 220 moves following the switching lever 90. Thus, the movable gear 220 moves in accordance with the position (the movement) of the switching lever 90 by the action of the force from the spring 227.

As shown in FIG. 4A, the switching lever 90 is disposed in a lever holder 240 forming the aforementioned hole HL. In FIG. 2, the hole HL is shown as having an abstracted rectangular shape. However, more specifically, the hole HL is formed in a shape shown in FIG. 4A. FIG. 4A shows a specific shape of the hole HL when viewed from above the guide rail 78. The lever holder 240 is fixedly attached to a hole formed at the guide rail 78.

The lever holder 240 has a lever positioning areas 241A, 241B, 241C, and 241D. When contacting an edge of the hole HL in the lever positioning area 241A, the switching lever 90 is held not to move to the main area of the carriage conveyance path even by the action of the forces from the springs 227 and 228. While the switching lever 90 is in the lever positioning area 241A, the movable gear 220 is placed in a position to engage with the connection gear 230A.

In response to the carriage 71 entering the maintenance area MA from the main area and goes toward the terminal end of the carriage conveyance path, the switching lever 90 comes into contact with the carriage 71 and receives a pressing force from the carriage 71. Thereby, the switching lever 90 moves from the lever positioning area 241A to the lever positioning area 241D. In response to the carriage 71 moving toward the main area of the carriage conveyance path, the switching lever 90 is released from the pressing force from the carriage 71, and moves from the lever positioning area 241D to the lever positioning area 241A by the action of the force from the spring 228.

In a state where the end portion 90E of the switching lever 90 is in contact with the movable gear 220, when the switching lever 90 is in the lever positioning area 241B, the movable gear 220 is placed in a position to engage with the connection gear 230B. Likewise, when the switching lever 90 is in the lever positioning area 241C, the movable gear 220 is placed in a position to engage with the connection gear 230C. Moreover, when the switching lever 90 is in the lever positioning area 241D, the movable gear 220 is placed in a position to engage with the connection gear 230D.

The switching lever 90 receives, at the end portion 90E thereof, a torsional force (i.e., a force in a circumferential direction of the shaft 225) from the spring 228. More specifically, the switching lever 90 receives a force directed toward a lower left side in FIG. 4A.

Accordingly, in a process of moving from the lever positioning area 241A to the lever positioning area 241D, the switching lever 90 moves along a lower edge of the hole HL in FIG. 4A. In the moving process, even though the carriage 71 moves backward to the main area, the switching lever 90 is held in the lever positioning area 241B or 241C by notches formed in the lever positioning areas 241B and 241C.

After the switching lever 90 is placed in the lever positioning area 241D, in response to the carriage 71 beginning to move backward, the switching lever 90 moves back to the lever positioning area 241A while being guided by a guide member 242, by the action of the force from the spring 228. The guide member 242 includes a rail formed to extend downward. The switching lever 90 moves back to the lever positioning area 241A while sliding in contact with the rail 243. At this time, the movable gear 220 moves to the connection gear 230A along with the switching lever 90, in response to receipt of the force from the end portion 90E of the switching lever 90.

The connection gears 230A-D are rotatably supported by a common shaft 235 parallel to the rotational axis of the movable gear 220. A rotational axis of the connection gears 230A-D is positionally coincident with the shaft 235. The connection gears 230A-D are disposed within the movable range of the movable gear 220 in their rotational axis direction.

The connection gear 230A is connected with the first sheet feeder 310. Specifically, in a state where the connection gear 230A engages with the movable gear 220, the connection gear 230A receives the driving force from the conveyance roller 120 via the driving gear 210 and the movable gear 220, and transmits the driving force to the first sheet feeder 310. Thereby, the first sheet feeder 310 is driven.

The connection gear 230B is connected with the second sheet feeder 320. Specifically, in a state where the connection gear 230B engages with the movable gear 220, the connection gear 230B receives the driving force from the conveyance roller 120 via the driving gear 210 and the movable gear 220, and transmits the driving force to the second sheet feeder 320. Thereby, the second sheet feeder 320 is driven.

The connection gear 230C is connected with the sheet reverser 330. Specifically, in a state where the connection gear 230C engages with the movable gear 220, the connection gear 230B receives the driving force from the conveyance roller 120 via the driving gear 210 and the movable gear 220, and transmits the driving force to the sheet reverser 330. Thereby, the sheet reverser 330 is driven.

The connection gear 230D includes a bevel gear 231 connected with the maintenance unit 340. In a state where the connection gear 230D engages with the movable gear 220, the connection gear 230D receives the driving force from the conveyance roller 120 via the driving gear 210 and the movable gear 220, and transmits the driving force to the maintenance unit 340. Thereby, the maintenance unit 340 (more specifically, the pump) is driven.

In response to the switching lever 90 moving, in the lever positioning area 241D, toward the terminal end of the carriage conveyance path, the movable gear 220 is urged by the spring 227, but is prevented from moving toward the terminal end, by the bevel gear 231 of the connection gear 230D. Thereby, the movable gear 220 is maintained connected with the connection gear 230D, and is separated away from the end portion 90E of the switching lever 90 moving toward the terminal end.

In response to the switching lever 90 moving, in the lever positioning area 241D, toward the terminal end of the carriage conveyance path, the capping mechanism 350 lifts up the cap 351 in conjunction with movement of the carriage 71. In response to the switching lever 90 reaching an end 241DE of the lever positioning area 241D, the operation of capping the recording head 80 is completed.

The terminal end (where the operation of capping the recording head 80 is completed when the carriage 71 reaches) of the carriage conveyance path corresponds to a home position of the carriage 71. The MFP 1 maintains a state where the carriage 71 is in the home position, during a period of time in which it is unnecessary to perform image formation on a sheet Q (e.g., when the MFP 1 serves as an image scanner). At this time, the switching lever 90 is maintained placed in the end 241DE. Further, at this time, a power transmission path is interrupted between the conveyance motor 110 and each of the first sheet feeder 310, the second sheet feeder 320, and the sheet reverser 330. In other words, at this time, the first sheet feeder 310, the second sheet feeder 320, and the sheet reverser 330 are disconnected from the conveyance motor 110.

In response to the carriage 71 entering the main area from the home position, the switching lever 90 positioned in the lever positioning area 241D moves back to the lever positioning area 241A while being guided by the guide member 242. Along with the movement of the switching lever 90, while the end portion 90E of the switching lever 90 is in contact with the movable gear 220, the movable gear 200 moves from the position to engage with the connection gear 230D to the position to engage with the connection gear 230A. The lever positioning area 241A is the first area where the switching lever 90 is placed when returning from the lever positioning area 241D.

Subsequently, a detailed explanation will be provided of processes to be executed by the controller 10. The controller 10 performs the below-mentioned processes in accordance with programs stored in the ROM 13 or the NVRAM 17. In response to the MFP 1 being powered on, the controller 10 displays various screens on the display 31 and accepts user operations on the screens via the operation panel 35 by repeatedly performing an operation accepting process shown in FIG. 5.

Figure 5:
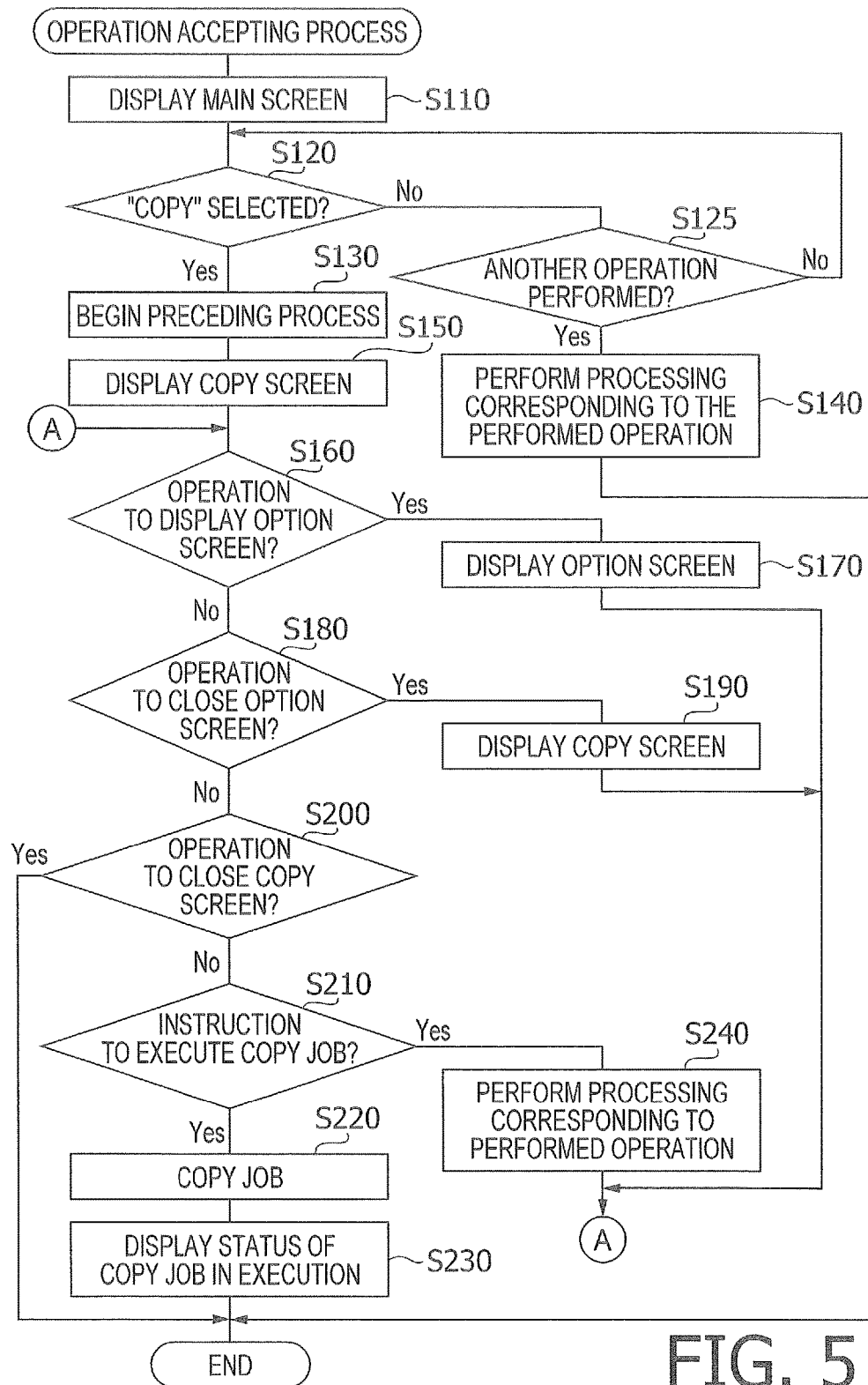
FIG. 5 is a flowchart showing a procedure of an operation accepting process to be executed by a controller of the MFP in accordance with one or more aspects of the present disclosure.

In response to starting the operation accepting process shown in FIG. 5, the controller 10 controls the display 31 to display a main screen G1 shown in an upper area of FIG. 6 (S110). The main screen G1 is the uppermost-layer screen among screens to be displayed in a hierarchical manner.

The main screen G1 is configured to allow a user to select one of available functions of the MFP 1 such as the scanning function, the copy function, and the facsimile function. The main screen G1 shown in the upper area of FIG. 6 includes operable objects J11, J12, and J13. The operable object J11 corresponds to the facsimile function. The operable object J12 corresponds to the copy function. The operable object J13 corresponds to the scanning function.

It is not possible to select the printing function on the main screen G1. However, when print data is transmitted by the external terminal device 5, and the controller 10 executes a print job, the printing function is implemented. In the print job, the controller 10 controls the print driver 50 and the conveyance driver 60 to form an image based on the print data on a sheet Q while controlling operations of discharging ink droplets from the recording head 80, feeding the sheet Q, and conveying the sheet Q to the print position.

While the main screen G1 is displayed, the controller 10 waits until the operable object J12 is pressed or until another operation is performed on the main screen G1 (S120: No, and S125: No). In response to the operable object J12 being pressed to select the copy function (S120: Yes), the controller 10 goes to S130. Meanwhile, in response to another operation being performed on the main screen G1 (S120: No, and S125: Yes), the controller 10 goes to S140 to perform processing corresponding to the operation performed on the main screen G1.

For instance, in response to the operable object J11 being pressed on the main screen G1, the controller 10 controls the display 31 to switch the main screen G1, which is being displayed on the display 31, to a facsimile transmission screen (S140). The facsimile transmission screen (hereinafter referred to as a "FAX transmission screen") is a sub screen that is one-layer lower than the main screen G1 in the hierarchical screen structure. The FAX transmission screen is configured to accept instructions input via the operation panel 35 such as an instruction to execute a FAX transmission job and an instruction to display an advanced setting screen for a FAX transmission operation. In response to an instruction to execute a FAX transmission job being input via the operation panel 35, the controller 10 executes the FAX transmission job.

The FAX transmission job includes a step of controlling the image scanner 40 to scan a document, and a step of transmitting, to the external facsimile machine 3, scanned image data received from the image scanner 40, as facsimile data. The FAX transmission job does not include a printing operation of performing image formation on a sheet Q. Namely, the FAX transmission job does not include a step of driving the first sheet feeder 310 or the second sheet feeder 320. In response to the FAX transmission job being completed, the main screen G1 is displayed on the display 31.

In response to the operable object J13 being pressed on the main screen G1, the controller 10 controls the display 31 to switch the main screen G1 being displayed on the display 31 to a scan screen (S140). The scan screen is a sub screen that is one-layer lower than the main screen G1 in the hierarchical screen structure. The scan screen is configured to accept instructions input via the operation panel 35 such as an instruction to execute a scan job and an instruction to display an advanced setting screen for a scanning operation. In response to an instruction to execute a scan job being input via the operation panel 35, the controller 10 executes the scan job.

The scan job includes a step of controlling the image scanner 40 to scan a document, and a step of transmitting to the external terminal device 5 or storing into the NVRAM 17, scanned image data received from the image scanner 40. The scan job does not include a printing operation of performing image formation on a sheet Q. Namely, the scan job does not include a step of driving the first sheet feeder 310 or the second sheet feeder 320. In response to the scan job being completed, the main screen G1 is displayed on the display 31.

Meanwhile, in response to the operable object J12 being pressed on the main screen G1, and the controller 10 goes to S130, the controller 10 begins a preceding process shown in FIG. 7. The preceding process is executed in parallel with the operation accepting process.

The preceding process is a process to make one of the first sheet feeder 310 and the second sheet feeder 320 ready to be used for a copy job, in advance of issuance of an instruction to execute the copy job. As described above, to drive the first sheet feeder 310 or the second sheet feeder 320, it is required that the carriage 71 should move the switching lever 90, and that the movable gear 220 should be connected with the connection gear 230A or the connection gear 230B. Further, prior to image formation on a sheet Q, it is required that the carriage should move such that the cap 351 is removed from the recording head 80. The preceding process is for implementing the above required operations in advance of image formation on the sheet Q. The preceding process will be described later in detail.

In response to the preceding process being started in S130, the controller 10 controls the display 31 to switch the main screen G1 on the display 31 to a copy screen G2 shown in a middle-level area of FIG. 6 (S150). The copy screen G2 is a sub screen that is one-layer lower than the main screen G1 in the hierarchical screen structure. The copy screen G2 is configured to accept instructions input via the operation panel 35 such as an instruction to execute a copy job and an instruction to display a lower option screen G3.

The copy screen G2 includes operable objects J21, J22, and J23. The operable object J21 is for accepting an operation to select a high-image-quality copy mode. The operable object J22 is for accepting an operation to select a standard copy mode. The operable object J23 is for accepting an operation to select a double-side copy mode. The high-image-quality copy mode is an operational mode to perform single-side printing of copy images of a document on the sheets Q with high image quality. The standard copy mode is an operational mode to perform single-side printing of copy images of a document on the sheets Q with standard image quality. The double-side copy mode is an operational mode to perform double-side printing of copy images of a document on the sheets Q.

The copy screen G2 further includes operable objects J24, J25, J26, and J27. The operable object J24 is for accepting an instruction to display the option screen G3. Each of the operable objects J25 and J26 is for accepting an instruction to execute a copy job. The operable object J27 is for accepting an operation to close the copy screen G2.

As shown in a lower area of FIG. 6, the option screen G3 is configured to accept an operation to change a setting value of each of a plurality of parameters that define copy execution conditions for executing the copy job. The copy execution conditions include conditions such as image quality of a copy image, a type and a size of a sheet Q on which the copy image is to be printed, and a feed tray to be used.

An initial value of each of the parameters is previously determined for each of the high-image-quality copy mode, the standard copy mode, and the double-side copy mode. On the option screen G3, it is possible to change the setting value of each parameter from the initial value for a selected one of the copy modes. When any operation to select one of the copy modes is not performed on the copy screen G2, the standard copy mode is regarded as a user-selected copy mode, and the option screen G3 accepts an operation to change the setting values.

As exemplified in the lower area of FIG. 6, the option screen G3 is configured to accept an operation to change a setting value of each of the parameters such as the image quality, the sheet type, the sheet size, and the feed tray. In the first illustrative embodiment, the MFP 1 includes the first tray 313 and the second tray 323 as feed trays. Based on the setting value of the feed tray as a parameter changeable on the option screen G3, it is determined which one of the first tray 313 and the second tray 323 is to be used for feeding the sheets Q to the conveyance roller 120.

When the setting value of the feed tray is "Automatic Selection," the controller 10 automatically selects one of the first tray 313 and the second tray 323 as a feed tray to be used, based on the sheet type and the sheet size. The type and the size of the sheets Q accommodated in each of the first tray 313 and the second tray 323 are previously notified of by the user. When the setting value of the feed tray is "First Tray" or "Second Tray" instead of "Automatic Selection," the controller 10 disregards the feed tray specified based on the sheet type and the sheet size, and uses the feed tray identified by the setting value. An initial value of the feed tray in each copy mode is "Automatic Selection."

Based on an instruction to display the option screen G3 being input via the operation panel 35 in response to the operable object J24 being pressed while the copy screen G2 is displayed (S160: Yes), the controller 10 controls the display 31 to display the option screen G3 (S170). The option screen G3 includes an operable object J31 for accepting an operation to return to the copy screen.

In response to an operation of pressing the operable object J31 being performed as an operation to close the option screen G3 (S180: Yes), the controller 10 closes the option screen G3 and controls the display 31 to display the copy screen G2 (S190).

In response to an operation of pressing the operable object J27 being performed as an operation to close the copy screen G2 (S200: Yes), the controller 10 once ends the operation accepting process and controls the display 31 to display the main screen G1 (S110).

In response to an operation of pressing one of the operable objects J25 and J26 being performed as an operation to input an instruction to execute a copy job (S210: Yes), the controller 10 begins the copy job (S220), and controls the display 31 to display a screen that provides information on a status of the copy job in execution (S230). Then, in response to the copy job being completed, the controller 10 once ends the operation accepting process and controls the display 31 to display the main screen G1 (S110).

Specifically, in the copy job, the controller 10 controls individual elements included in the MFP 1 to achieve such a copy operation as to satisfy copy execution conditions corresponding to a copy mode selected on the copy screen G2 from among the high-image-quality copy mode, the standard copy mode, and the double-side copy mode or to satisfy copy execution conditions changed via the option screen G3.

In response to an instruction to execute the copy job being issued by pressing the operable object J25, the controller 10 performs, as the copy job, an operation of controlling the image scanner 40 to generate monochrome scanned image data. Further, the controller 10 issues, to the print driver 50 and the conveyance driver 60, such commands that a monochrome copy image based on the scanned image data is printed on a sheet Q fed from a feed tray (the first tray 313 or the second tray 323) specified by the copy execution conditions, with an image quality level specified by the copy execution conditions.

By issuing the commands to the print driver 50 and the conveyance driver 60, the controller 10 controls a carriage conveyance operation for the carriage 71, an ink discharge operation by the recording head 80, a position of the switching lever 90, driving of the first sheet feeder 310 or the second sheet feeder 320, a sheet feeding operation by the first sheet feeder 310 or the second sheet feeder 320, and a sheet conveyance operation by the sheet conveyor 100.

Likewise, in response to an instruction to execute the copy job being issued by pressing the operable object J26, the controller 10 controls the image scanner 40 to generate color scanned image data. Further, the controller 10 issues, to the print driver 50 and the conveyance driver 60, such commands that a color copy image based on the scanned image data is printed on a sheet Q fed from a feed tray (the first tray 313 or the second tray 323) specified by the copy execution conditions, with an image quality level specified by the copy execution conditions.

In response to another operation being performed on the copy screen G2 or the option screen G3, the controller 10 goes to S240 to perform processing corresponding to the operation performed on the copy screen G2 or the option screen G3. For instance, in response to the operable object J21 being pressed on the copy screen G2, the controller 10 sets copy execution conditions for performing single-side printing of high-image-quality copy images on sheets Q. In response to the operable object J22 being pressed on the copy screen G2, the controller 10 sets copy execution conditions for performing single-side printing of standard-image-quality copy images on sheets Q. In response to the operable object J23 being pressed on the copy screen G2, the controller 10 sets copy execution conditions for performing double-side printing of standard-image-quality copy images on sheets Q.

The controller 10 repeatedly performs the operations corresponding to the user operations in the steps of S160 to S240, until an operation to close the copy screen G2 (S200: Yes) is performed or until the copy job is executed in accordance with an instruction to execute the copy job (S210: Yes).

Subsequently, referring to FIG. 7, a detailed explanation will be provided of the preceding process to be begun in S130 by the controller 10. In response to beginning the preceding process, the controller 10 first performs an uncapping process (S310).

The uncapping process is a process of removing the cap 351 from the recording head 80 by controlling the carriage 71 via the carriage conveyor 70. In the uncapping process, the controller 10 controls the carriage 71 to move from the terminal end (i.e., the home position) of the maintenance area MA to the main area. Thereby, the switching lever 90 moves from the lever positioning area 241D to the lever positioning area 241A.

Hereinafter, the lever positioning area 241A, the lever positioning area 241B, the lever positioning area 241C, and the lever positioning area 241D may be referred to as a "position A," a "position B," a "position C," and a "position D," respectively.

In response to the carriage 71 being moved toward the main area in a state where the switching lever 90 is in the position D (e.g., the end 241DE), the switching lever 90 moves to the position A while being guided by the guide member 242, without being locked by any of the notches of the lever holder 240 that are formed in the positions B and C. Along with the movement of the switching lever 90, the movable gear 220 moves to the position to engage with the connection gear 230A. In response to the switching lever 90 moving from the position D (e.g., the end 241DE) to the position A, the elevator 353 operates to take the cap 351 downward, and the cap 351 is removed from the recording head 80.

It is noted that, in the uncapping process, the controller 10 moves the switching lever 90 to the position A while performing a control operation to finely rotate the movable gear 220 alternately in a forward rotational direction and a backward rotational direction via the driving gear 210. The fine rotation is achieved by controlling rotation of the conveyance motor 110 via the conveyance driver 60. By repeating the fine rotation of the movable gear 220, a moment comes at which the teeth of the movable gear 220 get into alignment with the tooth grooves of a connection gear 230 in the moving direction of the movable gear 220. Thus, the movable gear 220 moves to the connection gear 230A. Hereinafter, the operation of finely rotating the driving gear 210 and the movable gear 220 alternately in the forward rotational direction and the backward rotational direction may be referred to as a "forward-backward rotating operation."

In the first illustrative embodiment, when moving the movable gear 220 to a position to engage with an intended connection gear 230, the controller 10 performs the forward-backward rotating operation along with controlling the position of the switching lever 90. Nonetheless, in a system configured to achieve engagement between gears without having to perform a forward-backward rotating operation, there is no need to perform the forward-backward rotating operation.

After completing the uncapping process in S310, the controller 10 determines which one of the first tray 313 and the second tray 323 is to be used for sheet feeding in accordance with the currently-set copy execution conditions (S320). Hereinafter, an intended one of the first tray 313 and the second tray 323 to be used for sheet feeding may be referred to as an "intended tray." In S320, the controller 10 determines, as the intended tray, a feed tray corresponding to a sheet type and a sheet size specified for the standard copy mode.

Thereafter, the controller 10 performs a drive switching process shown in FIG. 8 (S330). Thus, the controller 10 makes preparations for sheet feeding by changing the position of the switching lever 90 to a position corresponding to the intended tray. In the drive switching process, the controller 10 determines which one of the first tray 313 and the second tray 323 is the intended tray (S510). In response to determining that the first tray 313 is the intended tray, the controller 10 determines whether the switching lever 90 is in the position A (S520).

The controller 10 is allowed to determine whether the switching lever 90 is in the position A, based on position control performed so far for the carriage 71. Specifically, the controller 10 is configured to, each time the controller 10 moves the switching lever 90 by controlling the carriage 71, store a position of the moved switching lever 90, and to determine whether the switching lever 90 is in the position A, based on the stored positions of the switching lever 90.

In response to determining that the switching lever 90 is in the position A (S520: Yes), the controller 10 terminates the drive switching process. In response to determining that the switching lever 90 is not in the position A (S520: No), the controller 10 performs conveyance control for the carriage 71 to place the switching lever 90 into the position A, and further performs the forward-backward rotating operation to connect the movable gear 220 with the connection gear 230A (S530). Thereafter, the controller 10 terminates the drive switching process.

It is noted that when moving the switching lever 90 from the position B or C to the position A, the controller 10 performs conveyance control for the carriage 71 to move the switching lever 90 to the position D, and thereafter moves the carriage 71 to the position corresponding to the position A.

In response to determining that the second tray 323 is the intended tray, the controller 10 determines whether the switching lever 90 is in the position B (S540). In response to determining that the switching lever 90 is in the position B (S540: Yes), the controller 10 terminates the drive switching process.

In response to determining that the switching lever 90 is not in the position B (S540: No), the controller 10 performs conveyance control for the carriage 71 to place the switching lever 90 into the position B, and further performs the forward-backward rotating operation to connect the movable gear 220 with the connection gear 230B (S550). Thereafter, the controller 10 terminates the drive switching process.

Via the uncapping process in S310, the switching lever 90 is moved to the position A, and the movable gear 220 is brought into a state of engaging with the connection gear 230A. Accordingly, when the intended tray identified in S320 is the first tray 313, the controller 10 may not perform the drive switching process.

Further, in general, immediately after the main screen G1 is switched to the copy screen G2, it is not possible to identify which one of the first tray 313 and the second tray 323 the user desires to use as the intended tray. Accordingly, the controller 10 may not perform the determination in S320 or the drive switching process in S330. Namely, at an initial stage of the preceding process, the controller 10 may make preparations for sheet feeding from the first tray 313 by performing the uncapping process in S310 and connecting the movable gear 220 with the connection gear 230A. By recommending the user to set frequently-used sheets Q in the first tray 313 through a user's manual, it is possible to heighten an effect of the preparations for sheet feeding from the first tray 313.

After the preparations for sheet feeding from the first tray 313, the controller 10 may perform conveyance control for the carriage 71 to place the carriage 71 into a print start position, in the main area, to start printing in execution of the copy job, and may prepare to quickly print the copy image after issuance of the instruction to execute the copy job. The preparations are preferred for improvement of a response speed for responding to the instruction to execute the copy job.

After S310 to S330, the controller 10 goes to S340 and determines whether the recording head 80 is in an uncapped state. The uncapped state is a state where the cap 351 is not attached on the recording head 80. While the recording head 80 is not in the uncapped state, the carriage 71 is in the home position, and the recording head 80 is in a state where the nozzle surface thereof is covered with the cap 351. The controller 10 is allowed to make the determination in S340 by determining whether the carriage 71 is in the home position (at this time, the recording head 80 is not in the uncapped state) or not (at this time, the recording head 80 is in the uncapped state).

In response to determining that the recording head 80 is in the uncapped state (S340: Yes), the controller 10 goes to S400. In S400, the controller 10 determines whether a capping condition is satisfied. The capping condition corresponds to a requirement for again attaching the cap 351 onto the recording head 80 that is in the uncapped state. For instance, when the uncapped state of the recording head 80 is maintained for a particular period of time, the controller 10 may determine that the capping condition is satisfied.

In response to determining that the capping condition is satisfied (S400: Yes), the controller 10 performs a capping process (S410). In the capping process, the controller 10 attaches the cap 351 onto the recording head 80 by controlling the carriage 71 via the carriage conveyor 70. Further, in the capping process, the carriage 71 moves to the home position, and the switching lever 90 is placed in the end 241DE of the position D. The controller 10 terminates the capping process while maintaining the carriage 71 in the home position, and then goes to S340.

In response to determining that the recording head 80 is not in the uncapped state (S340: No), the controller 10 determines whether the copy screen G2 is being displayed on the display 31 (S350). In response to determining that the copy screen G2 is not being displayed on the display 31 (S350: No), the controller 10 goes to S400. Meanwhile, in response to determining that the copy screen G2 is being displayed on the display 31 (S350: Yes), the controller 10 goes to S360.

In S360, the controller 10 determines whether the recording head 80 is in the uncapped state, in the same manner as in S340. In response to determining that the recording head 80 is in the uncapped state (S360: Yes), the controller 10 goes to S380. Meanwhile, in response to determining that the recording head 80 is not in the uncapped state (S360:

No), the controller 10 performs the uncapping process (S370), and thereafter goes to S380.

In S380, the controller 10 determines the intended tray that meets the currently-set copy execution conditions, based on the setting values of the sheet size and the sheet type or the setting value of the feed tray. Thereafter, the controller 10 performs the drive switching process in the same manner as in S330 (S390). Via the drive switching process, the controller 10 connects the movable gear 220 with one of the connection gear 230A and the connection gear 230B, so as to drive a sheet feeder (i.e., one of the first sheet feeder 310 and the second sheet feeder 320) having the intended tray by the driving force from the conveyance motor 110. Thereafter, the controller 10 goes to S400.

In response to determining that the capping condition is not satisfied (S400: No), the controller 10 determines whether the intended tray has been changed (S420). In response to determining that the intended tray has been changed (S420: Yes), the controller 10 goes to S360. In S360, the controller 10 moves the switching lever 90 by controlling movement of the carriage 71, so as to drive the changed intended tray. Thereby, the controller 10 connects the movable gear 220 with one of the connection gears 230A and 230B corresponding to the intended tray (S390).

In S420, in response to an operation to change the setting value of at least one of the sheet type, the sheet size, and the feed tray being performed on the option screen G3, the controller 10 determines that the intended tray has been changed (S420: Yes). Further, in S420, in response to an operation to change the setting value of at least one of the sheet type, the sheet size, and the feed tray being performed on the copy screen G2, the controller 10 also determines that the intended tray has been changed (S420: Yes).

Meanwhile, in response to determining that the intended tray has not been changed (S420: No), the controller 10 determines whether an instruction to execute the copy job has been input by pressing the operable object J25 or J26 (S430). In response to determining that an instruction to execute the copy job has not been input (S430: No), the controller 10 goes to S340. Meanwhile, in response to determining that an instruction to execute the copy job has been input (S430: Yes), the controller 10 terminates the preceding process. It is noted that although the following procedure is not shown, in response to the operable object J27 being pressed without an instruction to execute the copy job being input, and the screen displayed on the display 31 being switched from the copy screen G2 to the main screen G1, the controller 10 may perform the same capping process as the process in S410, and thereafter may terminate the preceding process.

As described above, in the first illustrative embodiment, the controller 10 of the MFP 1 is configured to, in response to an instruction to execute one of a plurality of kinds of jobs such as a copy job, a scan job, and a FAX transmission job being input, execute the job corresponding to the input instruction (S220, and S140). The instruction is accepted on a sub screen that is one-layer lower in the hierarchical screen structure than the main screen G1 on which it is possible to select one of the copy job, the scan job, and the FAX transmission job as a job to be executed.

Further, the power transmitter 200 is configured to establish and interrupt a connection (i.e., connect and disconnect power transmission) between the conveyance motor 110 and one of the first sheet feeder 310 and the second sheet feeder 320. More specifically, when the switching lever 90 is in one of the position A and the position B, the power transmitter 200 establishes the connection between the conveyance motor 110 and a corresponding one of the first sheet feeder 310 and the second sheet feeder 320. Further, when the switching lever 90 is in the position C or the position D, the power transmitter 200 disconnects the conveyance motor 110 from the first sheet feeder 310 and the second sheet feeder 320.

The controller 10 is configured to perform the operation accepting process shown in FIG. 5, as a display control process for the display 31 of the user I/F 30. In addition, the controller 10 is configured to perform the preceding process shown in FIG. 7, as a process to be executed in advance of issuance of an instruction to execute the copy job.

In response to the copy job (the copy function) being selected on the main screen G1, in the preceding process, the controller 10 brings a specific one of the sheet feeders 310 and 320 into a drivable state where the specific sheet feeder is ready to be driven by the conveyance motor 110, by controlling the power transmitter 200 to connect the one of the sheet feeders 310 and 320 with the conveyance motor 110.

According to the MFP 1, the controller 10 is configured to execute the copy job including a sheet feeding operation and execute the scan job and the FAX transmission job that do not include a sheet feeding operation. Therefore, the controller 10 does not determine whether it is required to drive one of the first sheet feeder 310 and the second sheet feeder 320, until an instruction to execute the copy job is input.

Under these circumstances, at a point of time when the operable object J12 is pressed, and it becomes likely that an instruction to execute the copy job that requires one of the sheet feeders 310 and 320 to be driven will be input, the MFP 1 brings a specific one of the sheet feeders 310 and 320 into the drivable state where the specific sheet feeder is ready to be driven by the conveyance motor 110. Thus, according to the MFP 1, it is possible to make efficient preparations for driving one of the sheet feeders 310 and 320 in advance of the copy job that requires the preparations.

Further, in the preceding process of the first illustrative embodiment, by moving the carriage 71 and moving the switching lever 90 to the position A, the controller 10 removes the cap 351 from the recording head 80 and makes the recording head 80 ready for image formation on a sheet Q, along with connecting the conveyance motor 110 with the first sheet feeder 310. According to the first illustrative embodiment, when the switching lever 90 moves to the position D in conjunction with movement of the carriage 71 and movement of the switching lever 90 responsive to the movement of the carriage 71, and the sheet feeders 310 and 320 are disconnected from the conveyance motor 110, the capping mechanism 350 attaches the cap 351 onto the recording head 80. Meanwhile, when the switching lever 90 moves to the position A, and the sheet feeder 310 is connected with the conveyance motor 110, the capping mechanism 350 removes the cap 351 from the recording head 80.

Thus, according to the MFP 1 of the first illustrative embodiment, it is possible to effectively perform establishing and interrupting the connection between the conveyance motor 110 and one of the sheet feeders 310 and 320, and attaching and removing the cap 351, in conjunction with each other. Accordingly, the aforementioned preceding process is very useful for expediting sheet conveyance and improving throughput between issuance of an instruction to execute a copy job and completion of the copy job.

Further, according to the MFP 1 of the first illustrative embodiment, when a state where the cap 351 is removed from the recording head 80 is maintained for a particular period of time, the controller 10 performs the capping process of attaching the cap 351 onto the recording head 80 (S410). In the recording head 80 configured to discharge ink droplets from the discharge ports in the nozzle surface, when the discharge ports (the nozzle surface) is maintained uncapped for a long time, it might cause inconvenience such as ink clogging. Nonetheless, according to the first illustrative embodiment, it is possible to prevent such inconvenience from being caused by the advance preparations for the copy job.

Further, the option screen G3 is configured as a screen for changing the copy execution conditions for the copy job. In most cases where the uncapped state where the cap 351 is removed from the recording head 80 is maintained for a long time, the user is likely to be changing the settings of the copy execution conditions on the option screen G3. Meanwhile, after the option screen G3 is switched to the copy screen G2, it is highly likely that an instruction to execute the copy job will be input in a short time. Therefore, in the first illustrative embodiment, as described above, in the case where the cap 351 is attached on the recording head 80 while the copy screen G2 is being displayed on the display 31, the uncapping process (S370) is performed.

Thus, according to the first illustrative embodiment, even though it takes a time for the user to change the copy execution conditions, and therefore the cap 351 is attached onto the recording head 80, it is possible to make preparations for the copy job by quickly removing the cap 351 from the recording head 80 before the user inputs an instruction to execute the copy job after completing the setting change of the copy execution conditions.

Further, according to the first illustrative embodiment, the first sheet feeder 310 and the second sheet feeder 320 have the first tray 313 and the second tray 323, respectively. In the preceding process, firstly, the controller 10 brings into the drivable state a specific one of the sheet feeders 310 and 320 that has a tray accommodating sheets Q of the sheet size and the sheet type set for the standard copy mode (S320-S330). Accordingly, by determining frequently-used copy execution conditions as the copy execution conditions for the standard copy mode, it is possible to bring, into the drivable state, the specific one of the sheet feeders 310 and 320 that is likely to have a user's intended feed tray. Thus, it is possible to make efficient preparations for the copy job in advance.

The MFP 1 may be configured to allow the user to set the copy execution conditions for the standard copy mode. In this case, it is possible to make more efficient preparations in advance of the copy job. For example, the MFP 1 may be configured not to execute S320 or S330. In this case, it is possible to improve efficiency of the advance preparations, by prompting the user to use the first tray 313 as a standard tray.

Especially, in the first illustrative embodiment, the switching lever 90 is configured to change its position in a circulating manner and switch an effective tray in a predetermined order (i.e., an order from the first tray 313 to the second tray 323). In this case, the MFP 1 (the controller 10) may be configured to, without executing S320 or S330, set as an initial effective tray the first tray 313 of the first sheet feeder 310 that is first connected with the conveyance motor 110 in the uncapping process (S310), and thereafter maintain the state where the first tray 313 is set as the effective tray until an operation to change the effective tray is performed. When the MFP 1 is configured in this manner, it is possible to minimize the number of times the sheet feeder connected with the conveyance motor 110 is switched between the first sheet feeder 310 and the second sheet feeder 320, at a stage where the feed tray to be used is not determined. Thus, it is possible to prevent inefficient movement of the carriage 71 and achieve efficient advance preparations.

Further, in the first illustrative embodiment, in response to an operation to change the sheets Q to be fed or the feed tray to be used being performed via the user I/F 30, the MFP 1 (the controller 10) controls the power transmitter 200 (the switching lever 90) to change the connection state between the conveyance motor 110 and one of the first sheet feeder 310 and the second sheet feeder 320 so as to make it possible to perform sheet feeding from the feed tray according to the changing operation. Accordingly, in the first illustrative embodiment, it is possible to, when the sheet feeder set in the drivable state in S310 to S330 is not a user-intended sheet feeder, change the sheet feeder and make preparations in advance of an instruction to execute the copy job being input.

Thus, according to the first illustrative embodiment, it is possible to present the very useful MFP 1.

Second Illustrative Embodiment

Subsequently, a MFP 1 of a second illustrative embodiment will be described. In the second illustrative embodiment, the MFP 1 is configured such that the controller 10 further performs an interlocking switching process shown in FIG. 9, as well as the processes exemplified in the first illustrative embodiment. Hereinafter, therefore, the interlocking switching process will be particularly described as an explanation of the second illustrative embodiment.

In the second illustrative embodiment, during execution of the preceding process, the controller 10 repeatedly performs the interlocking switching process shown in FIG. 9, in parallel with the preceding process. In the interlocking switching process, the controller 10 waits until one of the first tray 313 and the second tray 323 is opened or closed (S610). The controller 10 is allowed to determine whether the first tray 313 has been opened or closed, based on a detection signal from the first opening-closing sensor 315. Further, the controller 10 is allowed to determine whether the second tray 323 has been opened or closed, based on a detection signal from the second opening-closing sensor 325.

In response to determining that one of the first tray 313 and the second tray 323 has been opened or closed (S610: Yes), the controller 10 goes to S630. In S630, the controller 10 determines whether the recording head 80 is in the uncapped state. In response to determining that the recording head 80 is in the uncapped state (S630: Yes), the controller 10 goes to S650. Meanwhile, in response to determining that the recording head 80 is not in the uncapped state (S630: No), the controller 10 performs the uncapping process (S640), and thereafter goes to S650.

In S650, the controller 10 determines, as the intended tray, one of the first tray 313 and the second tray 323 that has been opened or closed immediately before S650, and performs the drive switching process shown in FIG. 8 (S660). Thereby, the controller 10 controls movement of the carriage 71 and moves the switching lever 90 to bring, into the drivable state, the one of the first tray 313 and the second tray 323 that has been opened or closed immediately before S650. Thus, the movable gear 220 is connected with one of the connection gear 230A and the connection gear 230B corresponding to the one of the first tray 313 and the second tray 323 that has been opened or closed immediately before S650.

The controller 10 repeatedly performs the interlocking switching process until the controller 10 terminates the preceding process. Thus, according to the MFP 1 of the second illustrative embodiment, in response to detecting an opening-closing operation of opening or closing one of the first tray 313 and the second tray 323, the controller 10 changes the connection state between the conveyance motor 110 and one of the sheet feeders 310 and 320 so as to perform sheet feeding from the opened or closed feed tray.

When a feed tray has been opened or closed, it is highly likely that the user has opened or closed the feed tray with the intention to use the feed tray. Thus, according to the MFP 1 of the second illustrative embodiment, it is possible to make appropriate and efficient preparations for driving one of the sheet feeders 310 and 320 to perform sheet feeding from a user-intended one of the feed trays 313 and 323.

As a modification of the second illustrative embodiment, the controller 10 may be configured to, after determining that one of the first tray 313 and the second tray 323 has been opened or closed (S610: Yes), execute S620 shown in FIG. 9 before S630. The step S620 is an operation to harmonize the drive switching process to be executed responsive to opening or closing of a feed tray, with an operation to change the feed tray via the copy screen G2 or the option screen G3.

In the modification, in S620, the controller 10 determines whether particular conditions, required for the drive switching process to be executed responsive to opening or closing of a feed tray, are satisfied. In response to determining that the particular conditions are not satisfied (S620: No), the controller 10 goes to S610. Meanwhile, in response to determining that the particular conditions are satisfied (S620: Yes), the controller 10 goes to S630.

The particular conditions may include a condition that a permission to execute the drive switching process in response to a feed tray being opened or closed has been previously received from the user. Further, the particular conditions may include a condition that an operation to change the feed tray is not performed on the copy screen G2 or the option screen G3 during a particular period of time before opening or closing of the feed tray.

When a feed tray has been opened or closed, it is possible to establish a valid presumption that the user has an intention to use the feed tray that has been opened or closed. Nonetheless, the user might not necessarily intend to use the opened or closed feed tray. Accordingly, the multi-function 1 may be configured to, only when a feed tray has been opened or closed, and the particular conditions are satisfied, perform the drive switching process and make preparations for sheet feeding from the opened or closed feed tray. In this case, it is possible to make more preferable preparations in advance of the copy job.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

When the MFP 1 has a function to print on a sheet Q an image based on data recorded in a recording medium such as a memory card, the MFP 1 may be configured to perform substantially the same preceding process for the copy job as exemplified in the aforementioned first illustrative embodiment, at a point of time when the function has been selected as a function to be used, on the main screen G1.

Aspects of the present disclosure may be applied to an MFP having three or more feed trays. For instance, the MFP 1 may include a third sheet feeder having a third feed tray, instead of the sheet reverser 330.

In the aforementioned first illustrative embodiment, the elevator 353 moves up and down the cap 351 in response to the carriage 71 coming into contact with and being separated away from the wall 353A. Nonetheless, the MFP 1 may include an additional motor, and the elevator 353 may be configured to move up and down the cap 351 by the action of a driving force from the additional motor. In this configuration, the controller 10 may be configured to, in response to determining that the carriage 71 is in the home position via the carriage conveyor 70, move up the cap 351 by driving the additional motor to operate the elevator 353. Further, in the uncapping process, the controller 10 may move down the cap 351 by driving the additional motor to operate the elevator 353.

What is claimed is:

1. An image forming apparatus comprising:
   a motor;
   a plurality of sheet feeders each configured to feed a sheet in response to receipt of a driving force from the motor;
   a transmission assembly configured to establish and interrupt a connection between the motor and any one of the plurality of sheet feeders;
   an operation panel configured to accept a user input; and
   a controller configured to:
     accept a first user input to select one of a first job and a second job via the operation panel, the first job including driving one of the plurality of sheet feeders, the second job not including driving any of the plurality of sheet feeders;
     in response to acceptance of the first user input to select the first job, begin a preceding process in advance of accepting, via the operation panel, a second user input to issue an instruction to execute the first job, wherein the preceding process is performed to begin to connect an intended sheet feeder with the motor in advance of acceptance of the instruction to execute the first job, the preceding process comprising determining the intended sheet feeder from the plurality of sheet feeders, and controlling the transmission assembly to establish the connection between the motor and the intended sheet feeder;
     after beginning the preceding process in response to the acceptance of the first user input to select the first job accept the second user input to issue the instruction to execute the first job via the operation panel; and
     based on acceptance of the instruction, execute the first job.

2. The image forming apparatus according to claim 1, further comprising a display configured to display a screen regarding the first job and the second job.

3. The image forming apparatus according to claim 2, wherein the controller is further configured to:
perform a display control process comprising:
controlling the display to display a selection screen regarding acceptance of the selection of one of the first job and the second job to be executed; and
in response to the acceptance of the selection of the one of the first job and the second job via the operation panel while the selection screen is displayed on the display, controlling the display to display a sub screen regarding acceptance of the instruction to execute the selected job.

4. The image forming apparatus according to claim 3, further comprising:
an image forming unit comprising a recording head, the image forming unit being configured to perform image formation on the sheet by discharging ink droplets from the recording head; and
a cap configured to cap the recording head and separate from the recording head,
wherein the first job includes an operation of driving the image forming unit.

5. The image forming apparatus according to claim 4, wherein the controller is further configured to:
while displaying the sub screen on the display, accept an instruction to display a condition change screen via the operation panel;
while displaying the condition change screen on the display, accept an instruction to change an execution condition for the selected job and an instruction to display the sub screen; and
in accepting via the operation panel the instruction to display the sub screen, based on that the cap is attached on the recording head, separate the cap from the recording head.

6. The image forming apparatus according to claim 3, wherein the controller is further configured to, in response to the acceptance of the selection of the first job via the operation panel while the selection screen is displayed on the display, begin the preceding process.

7. The image forming apparatus according to claim 6, wherein the controller is further configured to begin the preceding process in advance of displaying the sub screen.

8. The image forming apparatus according to claim 1, further comprising an image forming unit comprising a recording head, the image forming unit being configured to perform image formation on the sheet by discharging ink droplets from the recording head,
wherein the first job includes an operation of driving the image forming unit.

9. The image forming apparatus according to claim 8, further comprising a cap configured to cap the recording head and separate from the recording head.

10. The image forming apparatus according to claim 9, wherein the controller is further configured to, based on an uncapped state where the cap is separated from the recording head being maintained for a particular period of time, perform a capping process of causing the cap to cap the recording head.

11. The image forming apparatus according to claim 9, wherein the controller is configured to, in the preceding process, cause the cap to separate from the recording head.

12. The image forming apparatus according to claim 11, further comprising a capping mechanism configured to remove the cap from the recording head in conjunction with the transmission assembly when the transmission assembly begins to establish the connection between the motor and the at least one sheet feeder from an interruption of the connection.

13. The image forming apparatus according to claim 1, wherein the transmission assembly is further configured to switch an effective sheet feeder in a predetermined order among the plurality of feeders, the effective sheet feeder being one of the plurality of sheet feeders that is connected with the motor by the transmission assembly and ready for sheet feeding therefrom.

14. The image forming apparatus according to claim 1, wherein the controller is further configured to:
accept information specifying a sheet to be fed, via the operation panel; and
in the preceding process, in response to acceptance of the information, control the transmission assembly to establish a connection between the motor and a specific sheet feeder of the plurality on sheet feeders, the specific sheet feeder accommodating the sheet specified by the accepted information.

15. The image forming apparatus according to claim 1, wherein each of the plurality of sheet feeders comprises a tray.

16. The image forming apparatus according to claim 15, further comprising a sensor configured to detect individual operations to the plurality of trays,
wherein the controller is further configured to, in response to detection of an operation to a particular one of the plurality of trays via the sensor, control the transmission assembly to establish a connection between the motor and a particular sheet feeder having the operated particular tray.

17. The image forming apparatus according to claim 1, further comprising an image scanner configured to generate scanned image by optically scanning a document,
wherein the first job is a copy job to form, on the sheet, a copy image based on the scanned image data generated by the image scanner.

18. The image forming apparatus according to claim 1, further comprising:
wherein the controller controls a display to:
display a selection screen; and
display a sub screen.

19. A method adapted to be implemented on a processor coupled with an image forming apparatus comprising a motor, a plurality of sheet feeders, a transmission assembly, and an operation panel, the method comprising:
accepting a selection of one of a first job and a second job via the operation panel, the first job including driving one of the plurality of sheet feeders, the second job not including driving any of the plurality of sheet feeders;
in response to acceptance of a first user input to select the first job, beginning a preceding process in advance of accepting, via the operation panel, a second user input to issue an instruction to execute the first job, wherein the preceding process is performed to begin to connect an intended sheet feeder of the plurality of sheet feeders with the motor in advance of acceptance of the instruction to execute the first job, the preceding process comprising determining the intended sheet feeder from the plurality of sheet feeders, and controlling the transmission assembly to establish the connection between the motor and the intended sheet feeder;

after beginning the preceding process in response to the acceptance of the first user input to select the first job, accepting the second user input to issue the instruction to execute the first job via the operation panel; and based on acceptance of the instruction, executing the first job.

20. The method according to claim 19, further comprising:

performing a display control process comprising:

controlling a display to display a selection screen regarding acceptance of a selection of one of the first job and the second job to be executed; and in response to the acceptance of the selection of the one of the first job and the second job via the operation panel while the selection screen is displayed on the display, controlling the display to display a sub screen regarding acceptance of the instruction to execute the selected job.

21. The method according to claim 20, wherein the preceding process is begun in response to the acceptance of the selection of the first job via the operation panel while the selection screen is displayed on the display.

22. The method according to claim 21, wherein the preceding process is begun in advance of displaying the sub screen.

* * * * *